(12) United States Patent
Scura et al.

(10) Patent No.: US 6,826,009 B1
(45) Date of Patent: Nov. 30, 2004

(54) DISK DRIVE INCLUDING A FILTER ELEMENT DISPOSED ALONG A DISK SURFACE FOR FILTERING DISK ROTATION INDUCED AIRFLOW

(75) Inventors: John E. Scura, Paso Robles, CA (US); Richard G. Krum, Morgan Hill, CA (US)

(73) Assignee: General Electric Capital Corporation, Beverly Hills, CA (US)

( * ) Notice: Subject to any disclaimer, the term of this patent is extended or adjusted under 35 U.S.C. 154(b) by 162 days.

(21) Appl. No.: 10/232,639

(22) Filed: Aug. 30, 2002

(51) Int. Cl.[7] ............................................. G11B 33/14
(52) U.S. Cl. .................................................. 360/97.03
(58) Field of Search ........................... 360/97.01, 97.02, 360/97.03, 98.01

(56) References Cited

U.S. PATENT DOCUMENTS

| | | | | |
|---|---|---|---|---|
| 4,857,087 A | * | 8/1989 | Bolton et al. ............... 55/385.6 |
| 5,229,899 A | * | 7/1993 | Brown et al. ............ 360/97.02 |
| 5,463,507 A | * | 10/1995 | Morehouse et al. ...... 360/97.02 |
| 5,646,800 A | * | 7/1997 | Mihara et al. ........... 360/97.01 |
| 5,850,317 A | * | 12/1998 | Gregory et al. .......... 360/97.01 |
| 6,097,568 A | * | 8/2000 | Ekhoff ...................... 360/97.02 |
| 6,266,208 B1 | * | 7/2001 | Voights .................... 360/97.02 |
| 6,296,691 B1 | * | 10/2001 | Gidumal ........................ 96/17 |
| 6,362,937 B1 | * | 3/2002 | Gibbs et al. ............. 360/256.1 |
| 6,560,065 B1 | | 5/2003 | Yang et al. ............... 360/97.02 |
| 6,624,966 B1 | | 9/2003 | Ou-Yang et al. .......... 360/97.02 |
| 6,636,379 B2 | * | 10/2003 | Rannow et al. .......... 360/97.02 |
| 2001/0028527 A1 | * | 10/2001 | Bae et al. ................. 360/97.02 |
| 2003/0156350 A1 | * | 8/2003 | Hong et al. .............. 360/97.02 |
| 2003/0202276 A1 | * | 10/2003 | Smith ...................... 360/97.02 |

* cited by examiner

Primary Examiner—Jefferson Evans

(57) ABSTRACT

A disk drive including a disk drive base. The disk drive further includes at least one rotatable disk including a disk surface extending to an outer disk edge. The disk drive further includes a head stack assembly rotatably attached to the disk drive base in operable communication with the disk. The disk drive further includes a filter coupled to the disk drive base. The filter includes a filter support disposed adjacent to the outer disk edge, and at least one filter element attached to the filter support disposed along the disk surface for filtering disk rotation induced airflow.

11 Claims, 4 Drawing Sheets

DISK DRIVE INCLUDING A FILTER ELEMENT DISPOSED ALONG A DISK SURFACE FOR FILTERING DISK ROTATION INDUCED AIRFLOW

CROSS-REFERENCE TO RELATED APPLICATIONS

Not Applicable.

1. Field of the Invention

The present invention relates generally to disk drives, and more particularly to a disk drive including a filter with a filter element disposed along a disk surface for filtering disk rotation induced airflow.

2. Description of the Prior Art

The typical hard disk drive includes a disk drive base, a head disk assembly (HDA), and a printed circuit board assembly (PCBA) attached to the disk drive base. The head disk assembly includes at least one magnetic disk, a spindle motor for rotating the disk, and a head stack assembly (HSA) having an actuator assembly having at least one transducer head, typically several, for reading and writing data from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

A topic of concern is the desire to filter particulate matter internal to the disk drive. For a variety of reasons particulate matter or debris may become airborne within the disk drive. It is contemplated that such particulate matter or debris may result in damage or otherwise degrade the performance of the disk drive. Accordingly, there is a need in the art for an improved disk drive for filtering disk rotation induced airflow in comparison to the prior art.

SUMMARY OF THE INVENTION

An aspect of the invention can be regarded as a disk drive including a disk drive base. The disk drive further includes at least one rotatable disk including a disk surface extending to an outer disk edge. The disk drive further includes a head stack assembly rotatably attached to the disk drive base in operable communication with the disk. The disk drive further includes a filter coupled to the disk drive base. The filter includes a filter support disposed adjacent to the outer disk edge, and at least one filter element attached to the filter support disposed along the disk surface for filtering disk rotation induced airflow.

According to various embodiments, the filter support may include a support arm extending radially inward along the disk surface from the outer disk edge. The support arm may include a slot sized and configured to receive the filter element. The support arm may include an airflow opening for receiving airflow from the filter element. The filter support may include a base portion disposed adjacent the outer disk edge coupled to the disk drive base, and the support arm may extend from the base portion. The head stack assembly may include a plurality of rotatable disks each including a disk surface extending to an outer disk edge. The filter may include a plurality of filter elements attached to the filter support with each of the filter elements being disposed adjacent a respective one of the disk surfaces of the disks for filtering disk rotation induced airflow. The filter support may include a plurality of support arms extending radially inward respectively along the disk surfaces from the outer disk edges of the disks. The filter element may be formed of an electro-statically charged material, such as an electret material. The filter element may be generally planar. The filter element may be angularly disposed with respect to the disk surface. The filter element may be elongate and extend radially inward along the disk surface.

DESCRIPTION OF THE PREFERRED EMBODIMENTS

Figure 1:
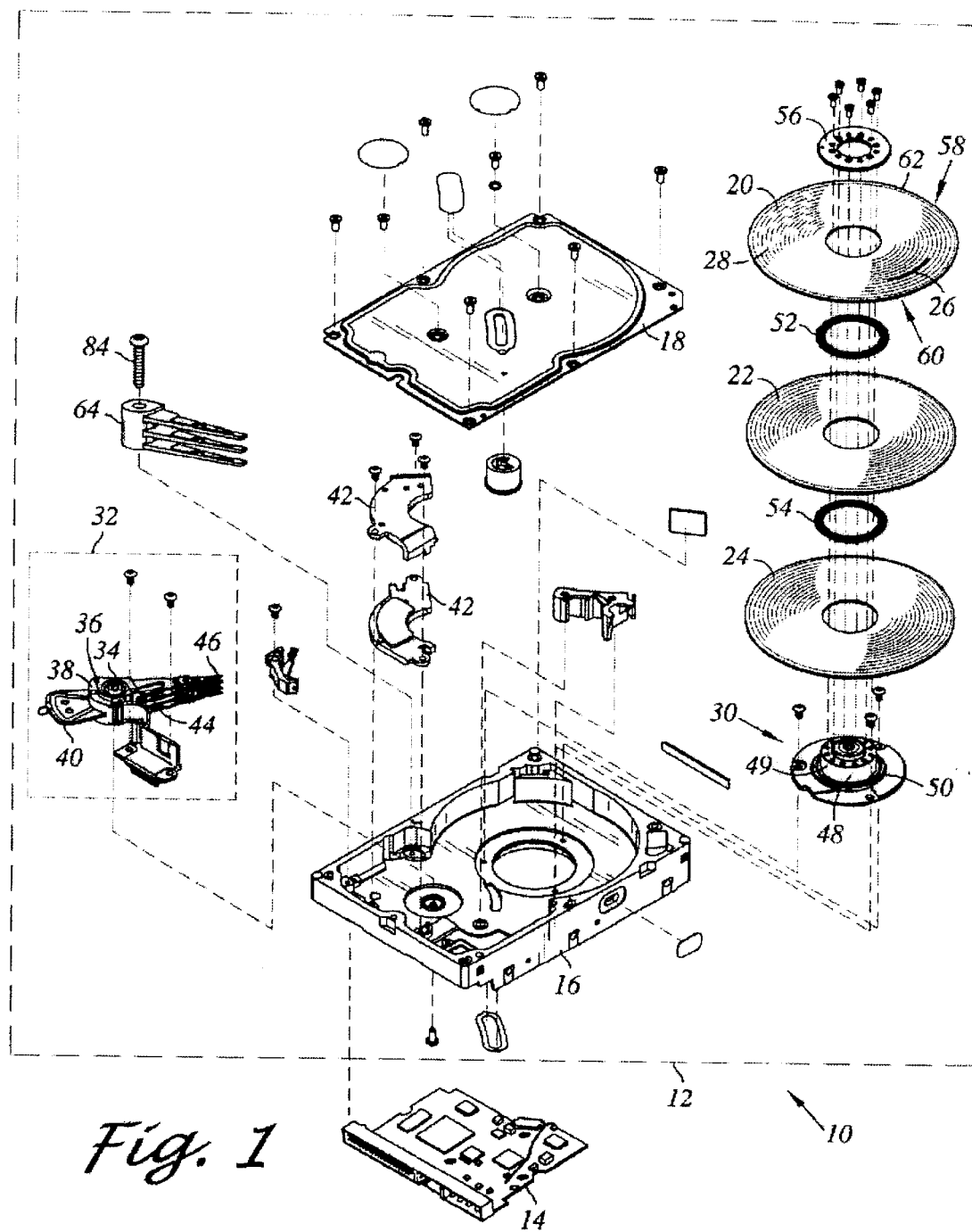
FIG. 1 is a perspective view of a disk drive including a filter as constructed in accordance with an aspect of the present invention.

Referring now to the drawings wherein the showings are for purposes of illustrating preferred embodiments of the present invention only, and not for purposes of limiting the same, FIGS. 1–6 illustrate a disk drive including a filter with a filter element in accordance with aspects of the present invention.

Figure 2:
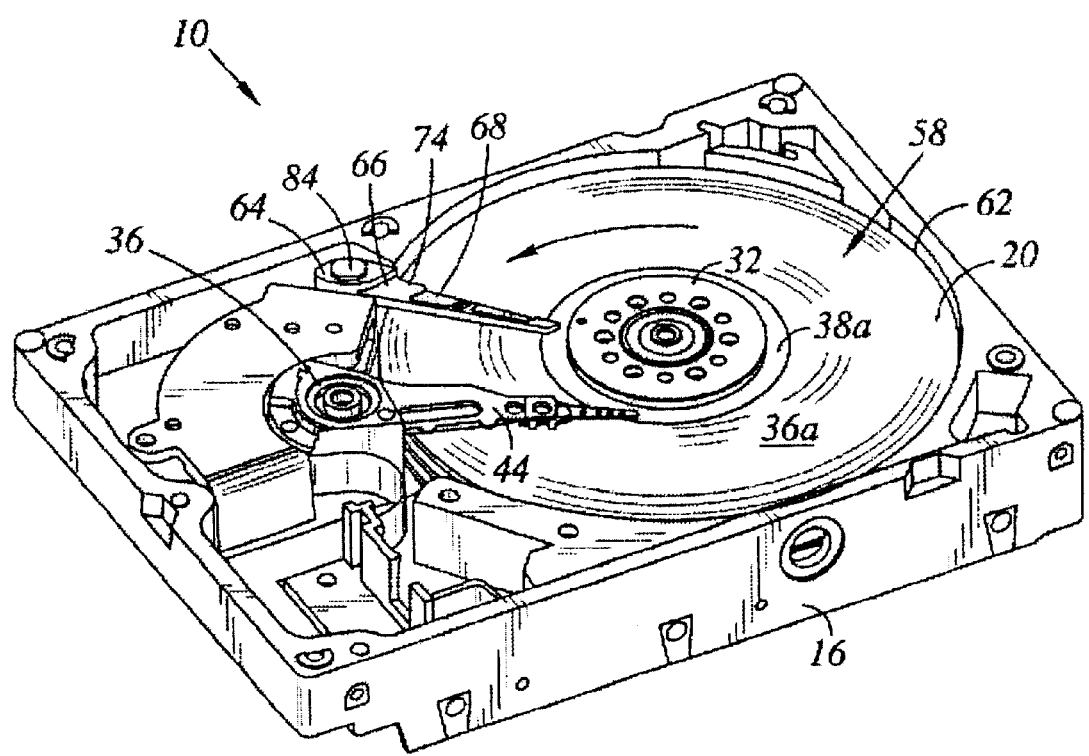
FIG. 2 is a perspective view of the disk drive of FIG. 1 as assembled (without a cover)

Referring now to FIG. 1 there is depicted an exploded perspective view of a disk drive 10 constructed in accordance with an aspect of the present invention. FIG. 2 is a perspective view of the disk drive 10 as assembled (without a cover 18). In the embodiment shown, the disk drive 10 includes a head disk assembly (HDA) 12 and a printed circuit board assembly (PCBA) 14. The head disk assembly 12 includes a housing which may include a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 20 is shown having a track 26 on an upper facing side 58 and a track 28 (shown in phantom) on a lower facing side 60. The head disk assembly 12 further includes a spindle motor 30 for rotating the magnetic disks 20, 22, 24. The head disk assembly 12 further includes a head stack assembly 32 and a pivot bearing cartridge 34. The head stack assembly 32 includes a rotary actuator 36.

The rotary actuator 36 includes an actuator body 38 that has a bore and the pivot bearing cartridge 34 engaged within the bore for facilitating the rotary actuator 36 to rotate between limited positions. The rotary actuator 36 further includes a coil portion 40 that extends from one side of the actuator body 38 to interact with a pair of permanent magnets 42 to form a voice coil motor for pivoting the rotary actuator 36. A plurality of actuator arms, the lowermost one of which being denoted 44, extend from an opposite side of the actuator body 38. As the disks 20, 22, 24 may be two sided, each of the actuator arms include either one or two head gimbal assemblies associated with the adjacent sides of the disks 20, 22, 24. Each head gimbal assembly includes an air bearing slider or slider (the uppermost one being denoted 46). Each air bearing slider 46 is contemplated to include a transducer head for reading and writing data to and from the disks 20, 22, 24.

The spindle motor 30 includes a spindle motor hub 48 that is rotatably attached to the disk drive base 16. The spindle motor hub 48 has a hub body 49 and a hub flange 50 that extends from the hub body 49. The hub flange 50 includes a supporting surface for supporting a lowermost one of the disks, namely disk 24. The remaining disks 22, 20 are stacked and separated with annular disk spacers 52, 54 that are disposed about the hub body 49. A disk clamp 56 is attached about the spindle motor hub 48 and is utilized to apply a clamping force against the topmost disk 20 for securing all the disks 20, 22, 24 to the spindle motor hub 48.

Figure 3:
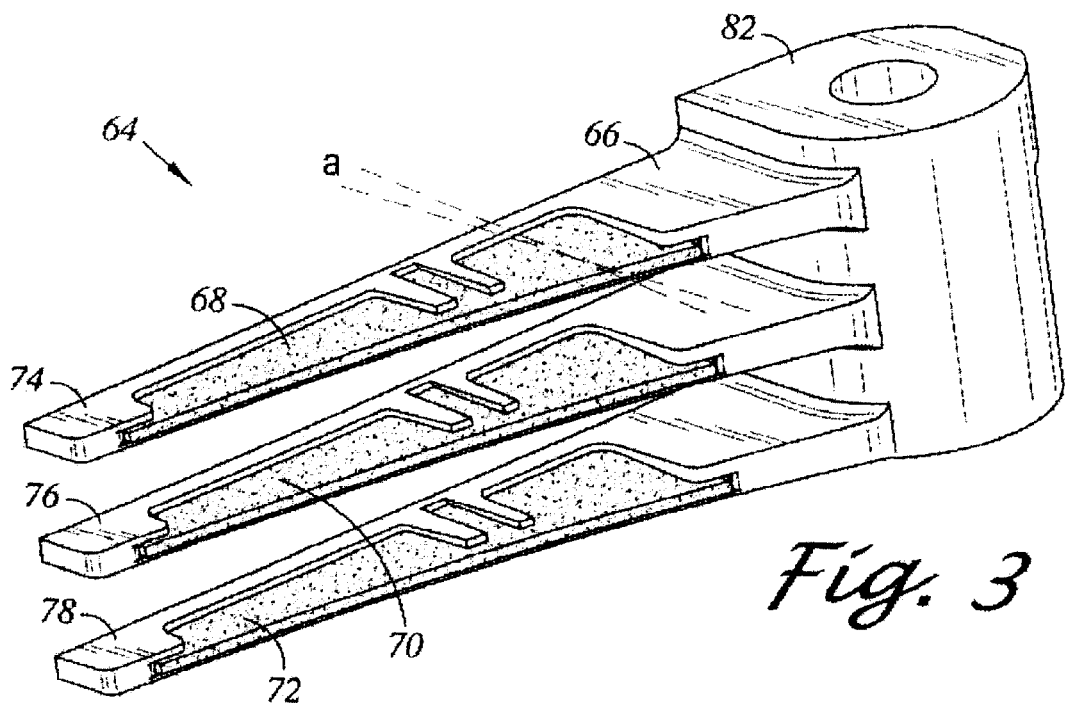
FIG. 3 is an enlarged perspective view of the filter of FIGS. 1 and 2.

Still referring now to FIGS. 1–2 there is depicted a disk drive 10 constructed in accordance with an aspect of the present invention. The disk drive 10 includes the disk drive base 18. The disk drive 10 further includes at least one rotatable disk, such as disk 20. The disk 20 includes the disk surface 26 extending to an outer disk edge 62. The disk drive 10 further includes the head stack assembly 32 rotatably attached to the disk drive base 18 in operable communication with the disk 20. The disk drive 10 further includes a filter 64 coupled to the disk drive base 18. Referring additionally now to FIG. 3, there is depicted an enlarged perspective view of the filter 64. The filter 64 includes a filter support 66 disposed adjacent to the outer disk edge 62, and at least one filter element 68 attached to the filter support 66 disposed along the disk surface 58 for filtering disk rotation induced airflow. In this regard the filter element 68 is disposed within the path of disk rotation airflow resulting in airflow passing though the filter element 68.

According to various embodiments, as the disk drive 10 may include a plurality of disks, such as disks 20, 22, 24, the filter 64 may include a plurality of filter elements, such as filter elements 68, 70, 72. In this regard, with the filter 64 installed, filter element 70 is disposed between disks 20 and 22. Likewise filter element 72 is disposed between disks 22 and 24.

The filter support 66 may take a variety of forms. In the embodiment shown, the filter support 66 includes a plurality of support arms 74, 76, 78 that extend radially inward along disk surfaces from the outer disk edges of the respective disks 20, 22, 24. In this regard, in relation to disk 20, the support arm 74 extends radially inward along the disk surface 58 from the outer disk edge 62 and is spaced apart from the disk surface 58 so as to not come into direct physical contact with the disk 20. Further, the support arm 76 is likewise disposed between disks 20 and 22, and the support arm 78 is disposed between disks 22 and 24.

The filter support 66 may include a base portion 82 disposed adjacent the outer disk edges of the disks 20, 22, 24 coupled to the disk drive base 18, and the support arms 74, 76, 78 may extend from the base portion 82. As shown in FIGS. 1 and 2, a fastener 84 may be utilized to secure the filter 64 to the disk drive base 18. In this regard, the fastener 84 fits though the base portion 82.

Figure 4:
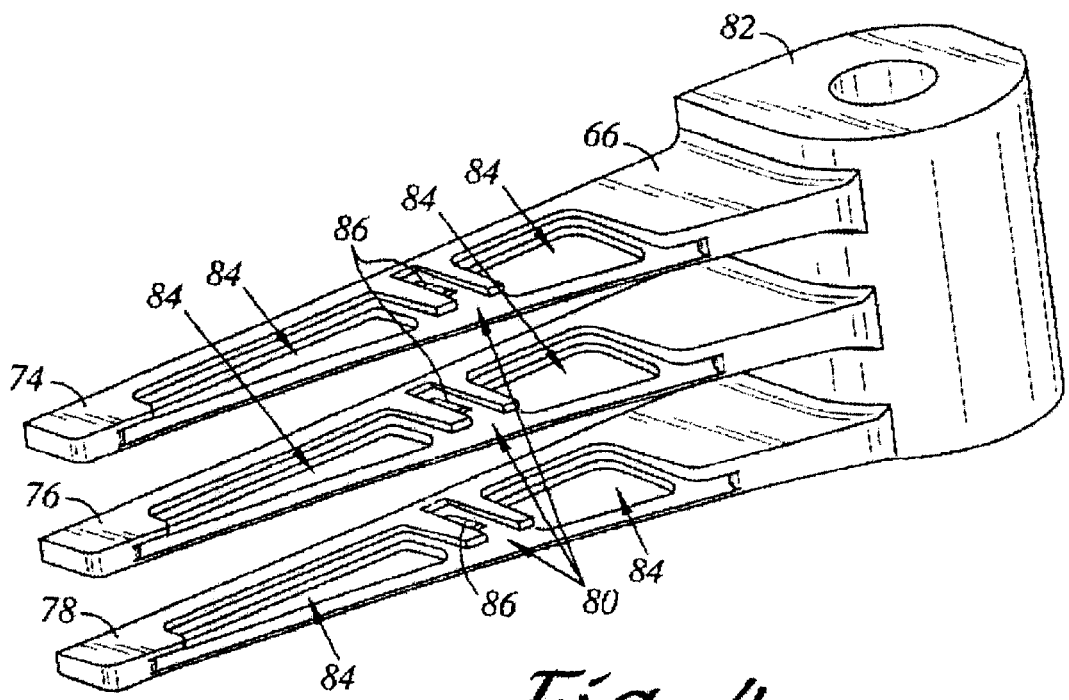
FIG. 4 is the filter of FIG. 3 however without filter elements.
Figure 5:
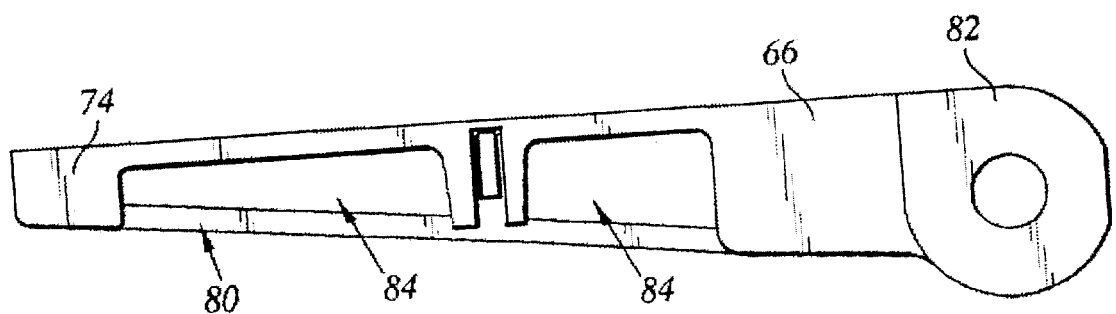
FIG. 5 is a top view of the filter of FIG. 4.
Figure 6:
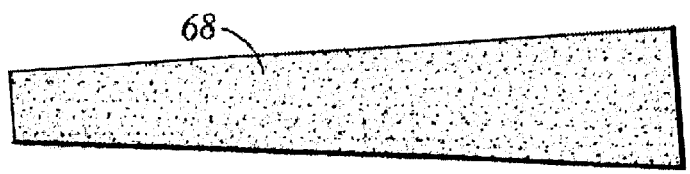
FIG. 6 is a top view of a filter element.

Referring additionally now to FIG. 4, there is depicted the filter 64 of FIG. 3 with just the filter support 66 shown without the filter elements 68, 70, 72. FIG. 5 is a top view of the filter support 66 shown in FIG. 4. Each support arm 74, 76, 78 may include a slot 80 sized and configured to respectively receive the filter element 68, 70, 72. The filter elements 68, 70, 72 may be attached to the filter support 66 in a variety of ways, such as being mechanically engaged, adhesively bonded or through heat staking processes for examples.

In addition, the support arms 74, 76, 78 may include airflow openings 88 for respectively receiving airflow from the filter elements 68, 70, 72. In the embodiment shown, the airflow openings 88 are disposed within the slots 80. As such, airflow is contemplated to pass through the filter elements 68, 70, 72 and through the airflow openings 88.

The filter elements 68, 70, 72 may be angularly disposed with respect to the disk surfaces. As illustrated in FIG. 3, filter element 68 is configured to be disposed at an angle "a" with respect to the horizontal plane. In this regard, the support arms 74, 76, 78 may be constructed to maintain the filter elements 68, 70, 72 at desired angular orientations. In the embodiment shown, the support arms 74, 76, 78 include within the slots 80 surface features 86 that result in the received filter elements 68, 70, 72 being disposed at the angle "a". In addition, such surface features 86 are disposed generally in the middle of the lengths of the filter elements 68, 70, 72 so as to result in the filter elements 68, 70, 72 becoming slightly arced. This tends to increase the rigidity of the filter elements 68, 70, 72 when exposed to disk rotation airflow during operation of the disk drive 10.

It is contemplated that because the filter elements 68, 70, 72 are disposed adjacent and along the disk surfaces, the filter elements are disposed directly in the path of the disk rotation induced airflow. This is unlike prior art filtering mechanisms which typically utilize filters located in chambers or passages positioned radially beyond the disks 20, 22, 24 with the disk rotation airflow being diverted into such chambers or passages. As a result, the disk drive 10 including the filter 64 of the present invention is contemplated to perform filtering at a higher degree efficiency because of its positioning in comparison to the prior art. Moreover, because the filter elements 68, 70, 72 are located adjacent the disk surfaces, a relatively larger amount of filtering media may be utilized in comparison to prior art designs which are limited by space constraints. This further enhances the filtering efficiency of the filter 64 in comparison to the prior art. As such, utilization of the filter 64 is contemplated to reduce clean up time of the disk drive 10 in comparison to disk drives with other filtering mechanisms.

The filter elements 68, 70, 72 may be formed of a variety of filtering materials and may utilize various mechanisms for achieving such filtering, such as through sieving, impaction, vanderwhals and electro-static. In this regard, the filter elements 68, 70, 72 may be formed of an electro-statically charged material, such as an electret material. An electret is a dielectric body in which a permanent state of electric polarization has been set up. The filter element 68, 70, 72 may be generally planar. Further, the filter elements 68, 70, 72 may be elongate and extend radially inward along the disk surfaces.

As indicated in FIG. 2, the disk drive 10 is configured to rotate the disks 20, 22, 24 in a counter-clockwise direction. In this regard, the filter 64 and the filter elements 68, 70, 72 are disposed up-stream of the head stack assembly 32 within a common quadrant relative to the disks 20, 22 24. It is contemplated that the filter 64 may be angularly disposed about the disks 20, 22, 24 at other locations relative to the head stack assembly 32. Moreover, while the filter 64 is oriented with the filter elements 68, 70, 72 and the support arms 74, 76, 78 extending radially with respect to the disks 20, 22, 24, other angular orientations are contemplated.

Rotation of the disks 20, 22, 24 results in disk rotation induced airflow about the disk surfaces. It is contemplated that another advantage of the embodiment of the filter 64 as shown is that in addition to performing a filtering function, the filter elements 68, 70, 72 and the support arms 74, 76, 78 mitigate such disk rotation induced airflow in comparison to a disk drive configuration which does not include the filter 64. In addition to simply creating a physical barrier to such airflow, the filter elements 68, 70, 72 and the support arms 74, 76, 78 tend to reduce the relative amount of turbulent airflow resulting in a relatively laminar airflow pattern. As such, this tends to mitigate airflow associated with excitation of the head stack assembly rigid body motion (i.e., arm turbulence), resonance response windage experienced by the head stack assembly 32, and vibration of the disks 20, 22, 24 (i.e., disk flutter) in comparison to a disk drive configuration without the filter 64.

We claim:

1. A disk drive comprising:
    a disk drive base;
    at least one rotatable disk including a disk surface extending to an outer disk edge;
    a head stack assembly rotatably attached to the disk drive base in operable communication with the disk; and
    a filter coupled to the disk drive base, the filter comprising:
        a filter support disposed adjacent to the outer disk edge, the filter support including a support arm extending radially inward along the disk surface from the outer disk edge; and
        at least one filter element attached to the filter support disposed along the disk surface for filtering disk rotation induced airflow.

2. The disk drive of claim 1 wherein the support arm includes a slot sized and configured to receive the filter element.

3. The disk drive of claim 2 wherein support arm includes an airflow opening for receiving airflow from the filter element.

4. The disk drive of claim 1 wherein the filter support includes a base portion disposed adjacent the outer disk edge coupled to the disk drive base, the support arm extends from the base portion.

5. The disk drive of claim 1 wherein the head stack assembly includes a plurality of rotatable disks each including a disk surface extending to an outer disk edge, the filter includes a plurality of filter elements attached to the filter support, each of the filter elements are disposed adjacent a respective one of the disk surfaces of the disks for filtering disk rotation induced airflow.

6. The disk drive of claim 5 wherein the filter support includes a plurality of support arms extending radially inward respectively along the disk surfaces from the outer disk edges of the disks.

7. The disk drive of claim 1 wherein the filter element is formed of an electro-statically charged material.

8. The disk drive of claim 7 wherein the filter element is formed of an electret material.

9. The disk drive of claim 1 wherein the filter element is generally planar.

10. The disk drive of claim 9 wherein the filter element is angularly disposed with respect to the disk surface.

11. The disk drive of claim 1 wherein the filter element is elongate and extends radially inward along the disk surface.

\* \* \* \* \*

UNITED STATES PATENT AND TRADEMARK OFFICE
CERTIFICATE OF CORRECTION

| | | |
|---|---|---|
| PATENT NO. | : 6,826,009 B1 | Page 1 of 1 |
| APPLICATION NO. | : 10/232639 | |
| DATED | : November 30, 2004 | |
| INVENTOR(S) | : John E. Scura and Richard G. Krum | |

It is certified that error appears in the above-identified patent and that said Letters Patent is hereby corrected as shown below:

On the Title Page, lime (73) Assignee:

Please delete "General Electric Capital Corporation, Beverly Hills, CA (US)" and replace therefore with -- Western Digital Technologies, Inc., Lake Forest, CA (US) --.

Signed and Sealed this

Twenty-second Day of August, 2006

JON W. DUDAS
*Director of the United States Patent and Trademark Office*